United States Patent Office 3,492,132
Patented Jan. 27, 1970

3,492,132
METHOD FOR THE MANUFACTURE OF PORTION-CONTROLLED UNITS OF PARTICULATE FOOD MATERIAL
Anthony S. Partyka, Chicago, Ill., assignor to National Dairy Products Corporation, New York, N.Y., a corporation of Delaware
No Drawing. Filed Dec. 13, 1965, Ser. No. 513,552
Int. Cl. A23g 5/00
U.S. Cl. 99—192                                    1 Claim

ABSTRACT OF THE DISCLOSURE

A method for the manufacture of portion-controlled units of food material which comprises forming a sheet of the desired food material of pre-selected thickness, width and length by placing the food material in a flexible bag, sealing the bag and flattening the bag and food material. Thereafter, the sheet of food material is frozen. After freezing, the sheet of food material is scored along a line which defines a portion-controlled unit. The scoring is effected by impressing a wedge-shaped groove in the frozen food material through the plastic bag by means of a die.

---

This invention relates to frozen food material and more particularly relates to a method for forming portion-controlled units of frozen food material.

A portion-controlled food unit is known to those skilled in the art of food technology as a pre-selected amount of food material sufficient to provide an individual serving. Such portion-controlled food units may comprise an individual serving of food material packaged in a single container or may comprise a plurality of individual servings of food material in a single container.

A particular type of food material, with which the present invention is concerned, is a moldable food material which is capable of being packaged as a portion-controlled unit and which is stored and distributed in a frozen condition. As used herein the term "moldable" refers to food materials to which a definite shape may be imparted through the use of pressure and includes both particulate food materials, such as hamburger, which may be molded at ambient temperatures; and relatively homogeneous materials such as ice cream, which are moldable in a frozen or partially frozen condition. It is known to provide portion-controlled units of such moldable food materials by metering a pre-selected quantity of the unfrozen or partially frozen food material into a mold or die, forming the food material into the desired shape and thereafter hard-freezing the formed portion-controlled food unit. According to this process, the food material must be tempered at carefully regulated temperatures to provide a material suitable for feeding to the press. The feeding of the food material is also critical; if too much is fed to the mold it will choke up or bind; if not enough is fed the resultant units are undersized and irregular in shape. If the food material is fed to the mold at too high a temperature, the formed units will slump or fold at the removal station. Also, the food material comes in direct contact with the mold surface or mold plate, and a layer of product tends to form thereon, leading to the possibility of bacteriological growth.

It would be desirable to prepare frozen portion-controlled units of moldable food material in a simple, inexpensive manner that is not dependent on critical temperature control or rate of feed of the food material. It would also be desirable to prepare such units in a manner that minimizes exposure of the food material to thereby diminish the possibility of bacterial growth.

Accordingly, it is a principal object of this invention to provide frozen portion-controlled units from moldable food materials. It is an additional object of this invention to provide a method for the manufacture of frozen portion-controlled units for moldable food materials which does not require controlled tempering during forming. A still further object is to provide a convenient, simple method for the manufacture of frozen portion-controlled units from moldable food materials with minimum opportunity for bacterial contamination.

Generally, in accordance with the present invention, the moldable food material is formed into a sheet of preselected thickness, width, and length and is subsequently frozen and scored along a line which defines the desired portion-controlled units.

More specifically, the present invention is directed to producing a frozen food material in units that are easily utilizable by the consumer without further handling or shaping. The food units may be usable as is after thawing, such as prepared sandwich fillings, or may require heating or cooking after thawing, such as raw ground beef. In each case, the units are designed to be of a size and weight suitable for individual portions. In the case of food materials suitable for use as sandwich components the size of the units are chosen to correspond to that of an average slice of bread.

The food material is formed into a sheet by any suitable method. "Sheet," as used herein, is meant in its broadest interpretation as having a relatively large length and width in comparison to depth. A convenient method for forming sheets of food material comprises placing a preselected amount of food material into a flexible bag, removing excess air from the bag, sealing the bag, and pressing or otherwise flattening the bag and its contents by suitable means to the desired thickness. The width and length of the bag after sealing then determine the length and width of the sheet of food material, while the thickness of the sheet is determined by the amount of food material that is placed in the bag. The flexible bags are preferably rectangular in shape and are preferably constructed from flexible plastic films, although other shapes and materials are equally suitable. "Plastic" as herein used in this application refers to that group of materials of high molecular weight that contain as the essential ingredient a synthetic or semi-synthetic organic substance made by polymerization or condensation or derived from a natural material by chemical treatment. Suitable plastics are those that are capable of forming films that remain flexible at temperatures below about 0° F. and that are inert with respect to the food material being processed. A preferred plastic material due to its low cost is polyethylene.

It is usually convenient to refrigerate the food material prior to loading into the plastic bag to inhibit bacterial growth. The refrigeration temperature is not critical and may be any temperature lower than about 40° F. that does not interfere with the operation of automatic filling equipment.

The resultant packaged sheets of food material are then placed on trays and are hard frozen at a temperature sufficiently low to render the sheet of food material relatively rigid. As used herein, the word "rigid" means that the frozen sheet will not deform significantly under its own weight or under the weight of the few numbers of sheets which conventionally would be placed together for freezing. Such temperature usually will be below about 0° F. The food product is usually sufficiently frozen for further processing after a period of about one hour but may be held at freezing temperatures indefinitely without deleterious results.

Following freezing the packaged sheets of food material are scored through the plastic bag so that after removal from the bag each sheet of food material may be broken into portion-controlled units of food material appropriate for individual use. By "scoring," as used herein, is meant the act of forming a permanent groove in the surface of the sheet of food material. The groove thus formed will be referred to as a score line.

The scoring may be accomplished by any suitable means, a preferred method being a press equipped with scoring means. The press comprises fixed and movable die sections and locating means for centering the frozen sheets of food material. Each die section comprises a plate having a raised rib or abutment which is opposed to a mating rib or abutment on the other die section. In operation, the frozen sheets of food material are located on the fixed die section and the two die sections are brought together by an actuating means which operates the movable die section. The opposing, mated, raised ribs of the die sections serve to press score lines through the plastic bag and into the surface of the frozen sheets of food material. The depth of the score line is controlled by stops on the press and is adjusted to provide a score line of a depth sufficient to permit easy separation of the portion-controlled units. This may usually be effected by adjusting the stops to provide a total scoring depth of no more than one quarter of the thickness of the sheet.

It can readily be seen that if it is desired to score the frozen sheet so that it may be broken in half the opposing mated ribs would consist of a single straight rib element on each die section. If it is desired to quarter the frozen sheet, the rib configuration would be that of a cross. The ribs are preferably wedge shaped in cross-section with slightly rounded outer edges to prevent cutting the polyethylene bag. The width of the rib is not critical but is usually about ⅛ inch at its widest part, tapering to about 1⁄16 inch at the outer edge.

Alternatively, one of the ribs may be sharpened to provide a knife edge to pierce one side of the polyethylene bag to permit easy removal of the portion-controlled units after scoring if it is desired to repackage the units in a more convenient package.

The function of the polyethylene, or other suitable plastic bag, is to provide a novel, convenient, completely sanitary method for forming the moldable food material into frozen sheets that may be readily divided into portion-controlled units by scoring means. After scoring is effected the sheets of portion-controlled units may be readily divided, while in the frozen state, into individual portion-controlled units and separated from the original plastic bag in which they were formed by any suitable means and subjected to further processing or repackaging.

If no further treatment is desired following scoring, the frozen sheets of food material are placed in appropriate cartons for shipment while in their original plastic bags. Subsequent handling may result in breaking of the portion-controlled units of the frozen sheets along the score line. This is not detrimental since the confines of the plastic bag prohibit shifting of the portion-controlled units within the bag.

In general, the method of producing portion controlled units of this invention may be applied to any food material that may be formed readily into sheets and that may be successfully frozen. Examples of such food products include prepared sandwich fillings, such as ham salad, chicken salad, tuna salad, beef salad, etc.; raw meats, such as ground beef, sausage, ground veal, lamb patties, etc.; or frozen desserts such as ice cream, cakes or pies.

The sanitary advantages of the method of this invention for producing portion-controlled units are readily apparent in that the food is sealed in a pliable bag throughout the operations of freezing, molding, and packing. Further advantages and various features of the present invention are further illustrated in the following example.

EXAMPLE I

A prepared ham salad was processed by the method of this invention to provide portion-controlled units suitable for use as a sandwich filling.

The ham salad sandwich filling was prepared in bulk and stored in a refrigerator at 40° F. The filling was removed as required and loaded into a commercially-available filling machine. Individual polyethylene bags were filled with 9 ounces of the filling. The bags were then checkweighed and partially flattened by hand to expel most of the air. After sealing the bags were flattened into square sheets that were 6½ inches on a side by conveying the bags under a roller. The flattened bags were then placed on trays and loaded into a −38° F. freezer. After one hour the sheets of ham salad product were frozen hard enough for effective scoring.

The scoring was accomplished by placing the sheets of frozen product one bag at a time in a scoring press with a cross-shaped die configuration. The press was closed and score lines were impressed to provide a sheet of frozen food material that was breakable into four portion-controlled units of sandwich filling. The scored product was then ready for packing and shipment.

Various changes and modifications to the above described method are readily apparent. Such changes and modifications are deemed to be within the scope of the invention.

What is claimed is:

1. A method for the manufacture of portion-controlled units of particulate food material which comprises forming a sheet of the desired particulate food material of pre-selected thickness, width and length by placing the food material in a flexible plastic bag, removing excess air from said bag, sealing said bag and flattening the food material therein to provide a sheet of the food material, freezing said sheet, and scoring said frozen sheet through said flexible plastic bag along a line which defines a portion-controlled unit by impressing the frozen sheet of food material so as to form opposed score lines of pre-selected depth, said scoring being sufficient to permit said frozen sheet to be easily broken into portion-controlled units of said food material.

References Cited

UNITED STATES PATENTS

| 1,810,864 | 6/1931 | Vogt. | |
| 2,217,392 | 10/1940 | Warfield. | |
| 2,288,970 | 7/1942 | Weisbender | 99—137 |
| 3,269,846 | 8/1966 | Wattenbarger | 99—194 X |

OTHER REFERENCES

Williams, "Chocolate and Confectionery" 1956, Published by Leonard Hill (Books) Limited, 9 Eden Street, N.W.I., London, pages 94 and 95, articles entitled Greer Refrigerated Cold Slab and Greer Hi-Gloss Cooling Tunnel.

HYMAN LORD, Primary Examiner

U.S. Cl. X.R.

99—137, 194